J. WILSON.
POWER PRESS.
APPLICATION FILED OCT. 21, 1912.
1,073,831.
Patented Sept. 23, 1913.
4 SHEETS—SHEET 1.
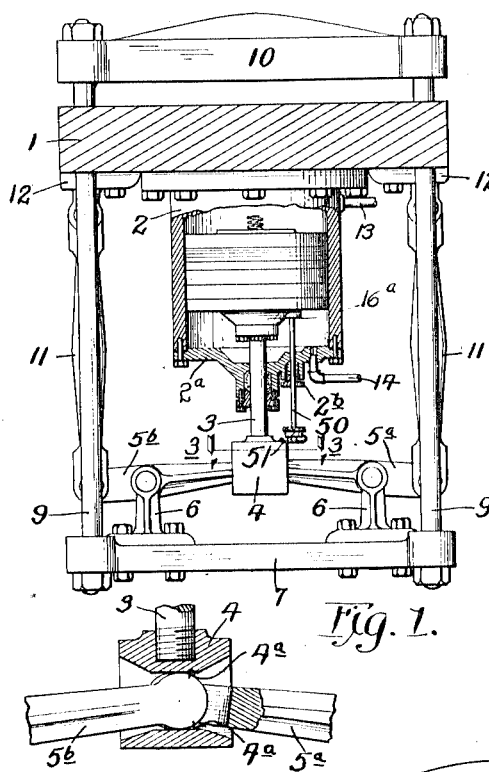
Fig. 1.
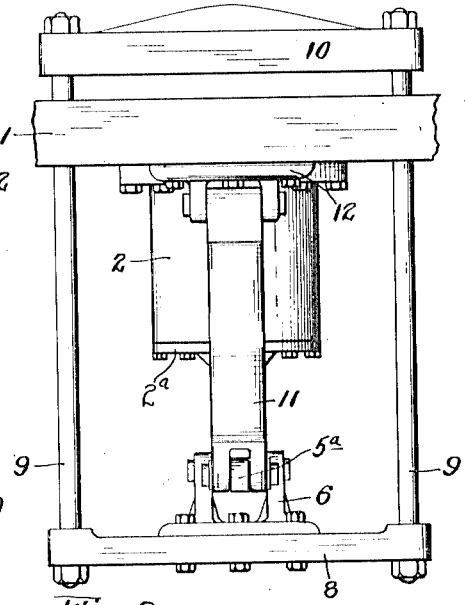
Fig. 2.
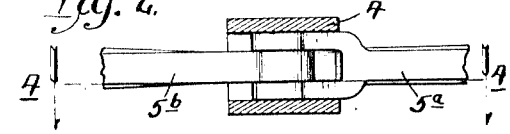
Fig. 3.
Fig. 4.
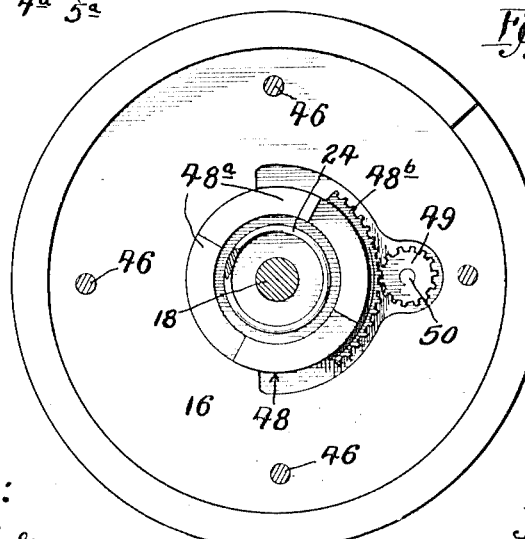
Fig. 6.
Witnesses:
Inventor:
John Wilson.
by Poole + Crouer
Attys.

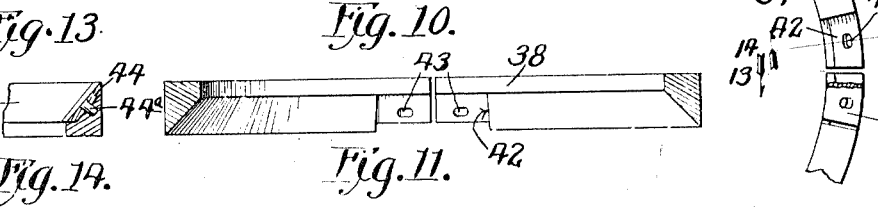

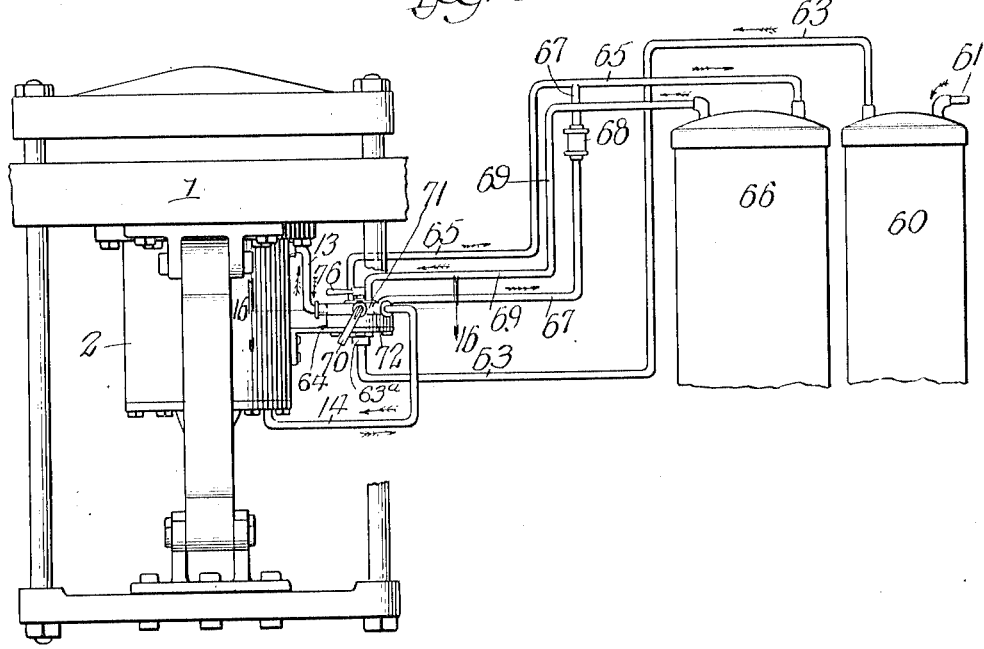

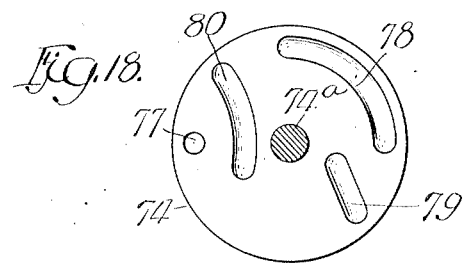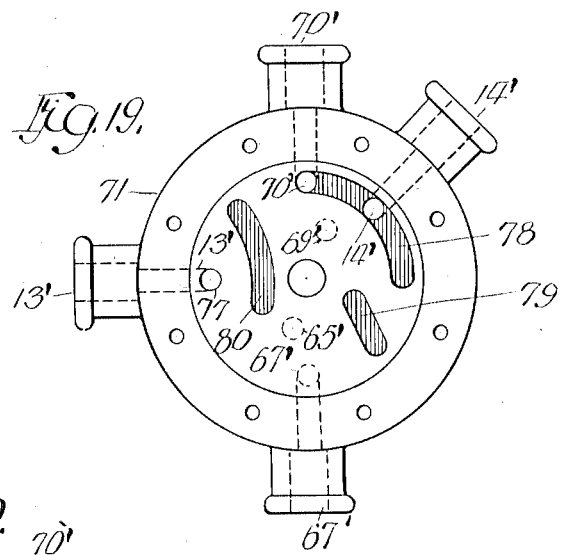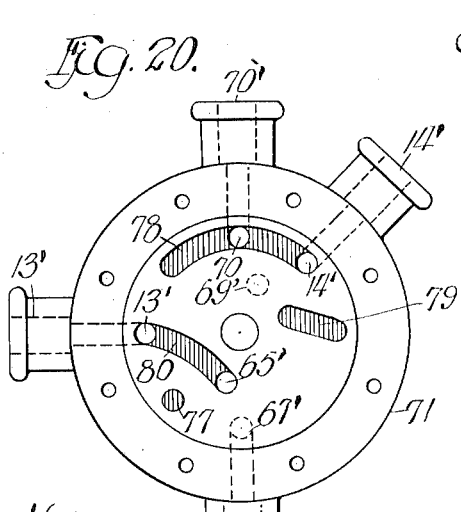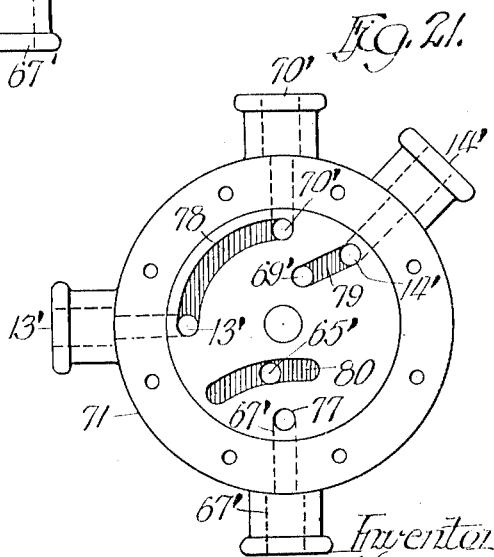

UNITED STATES PATENT OFFICE.

JOHN WILSON, OF CHICAGO, ILLINOIS, ASSIGNOR OF ONE-HALF TO JOHN AUN, OF CHICAGO, ILLINOIS.

POWER-PRESS.

1,073,831.   Specification of Letters Patent.   Patented Sept. 23, 1913.

Application filed October 21, 1912. Serial No. 726,927.

*To all whom it may concern:*

Be it known that I, JOHN WILSON, a citizen of the United States, and a resident of Chicago, in the county of Cook and State of Illinois, have invented certain new and useful Improvements in Power-Presses; and I do hereby declare that the following is a full, clear, and exact description thereof, reference being had to the accompanying drawings, and to the letters of reference marked thereon, which form a part of this specification.

This invention relates to improvements in power presses and particularly to improvements in piston mechanism for that class of power presses wherein varying and very high pressures are required to be applied to the piston mechanism and the high pressure required to be maintained for a predetermined time.

The principal object of the invention is to provide a simple, economical and efficient packing means for the pistons of power presses.

A further object of the invention is to provide a power press with piston mechanism adapted to be moved with a minimum expenditure of power and with a minimum of friction when the piston is subjected to a relatively low pressure, and adapted to cause the packing of the piston to more tightly engage the cylinder as the pressure to which the piston is subjected is increased and in proportion to the increase of such power or pressure in such a manner as to enable a very high pressure to be maintained and the piston to remain stationary for any desired length of time, without any leakage between the piston and the cylinder.

A further object of this invention is to provide a valve adapted to control the reciprocatory movement of the piston and particularly to utilize the pressure medium exhausted from the cylinder after the power stroke of the piston to actuate the same during its return stroke.

Other and further objects of the invention will appear from the following description.

In connection with stereotyping, or the process of producing molded printing forms by the use of matrices of plastic material, it is customary to place the layer of plastic material, and a type form, upon the heated table of the press beneath a plate or platen, by which the type form is pressed against the matrix; the matrix being held under very high pressure during the period consumed for the drying of the matrix. Much difficulty has been encountered in the use of such presses owing to leakage of the fluid between the walls of the cylinder and the piston and consequent relaxing of the pressure on the matrix while the latter is under high pressure. It has been proposed to use a piston divided into two parts, and provided with packing rings interposed between the piston parts and bearing against the walls of the cylinder. Such packing rings are automatically forced outward against the walls of the cylinder by the fluid pressure upon either side of the two-part piston, thereby reducing the leakage, but pistons so made have not been found satisfactory in cases where the fluid pressure is varied and particularly in cases where a very high pressure is required to be applied and maintained in the compression or power stroke and a relatively low pressure is employed for effecting the return stroke of the piston.

One feature of my invention, therefore, consists of a piston provided with two sets of packing rings of the expanding type, so made that in the power stroke one set of such rings is pressed outward with variable pressure, depending on the pressure on the piston, while in the return stroke, the other set is pressed outward uniformly and independently of the pressure on the piston.

The invention consists in the matters hereinafter described and more particularly pointed out in the appended claims.

In the drawings—Figure 1 is a view in front elevation of a press constructed in accordance with my invention, showing the movable members thereof, a portion of the stationary table and the cylinder in section; Fig. 2 is a view in side elevation of the device shown in Fig. 1; Fig. 3 is an enlarged horizontal sectional view in detail taken on line 3—3 of Fig. 1, showing the connections between the lower end of the piston rod and levers; Fig. 4 is an enlarged cross sectional detail view of parts shown in Fig. 3, taken on line 4—4 of Fig. 3; Fig. 5 is an enlarged, central, longitudinal sectional view of a piston constructed in accordance with my invention; Fig. 6 is a cross sectional view taken on line 6—6 of Fig. 5; Fig. 7 is a view in detail of a portion of the packing rings and adjusting mechanism, taken on line 7—7 of Fig. 5; Fig. 8 is a view in side elevation of the upper set of piston rings shown in Fig. 5; Fig. 9 is a detail view in elevation of a portion of the adjusting rings and micrometer adjusting device; Fig. 10 is a cross sectional view of the upper one of the lower pair of piston rings shown in Fig. 5; Fig. 11 is a cross sectional view of the lower one of the lower pair of piston rings shown in Fig. 5; Fig. 12 is a plan view of a portion of the packing rings, showing expansion joint with part of the locking plate removed; Fig. 13 is a cross sectional view taken on line 13—13 of Fig. 12; Fig. 14 is a cross sectional view taken on line 14—14 of Fig. 12; Fig. 15 is a view in elevation of the power press showing the controlling valve, piping and tanks; Fig. 16 is a cross sectional view taken on line 16—16 of Fig. 15; Fig. 17 is a cross sectional view taken on line 17—17 of Fig. 16; Fig. 18 is a top plan view of the valve disk with the valve stem in cross section; Figs. 19, 20 and 21 are diagrammatic views of the valve showing the relative portions of the valve disk and the valve body in each of the operative positions of the valve.

In constructing a power press in accordance with my invention, I provide a table 1 which is mounted in a stationary position upon any suitable solid foundation (not shown). Upon the table 1 is placed the object or material to be pressed, which in the case of a stereotype press would be the matrix. Mounted upon the under side of table 1, and preferably integral therewith, is the vertical pressure cylinder 2 which is provided with a cylinder head 2ª, as shown in Fig. 1. Within the cylinder is my improved type of piston, the detailed description of which will be taken up in another part of this specification. A piston rod 3, rigidly attached to the piston, extends downwardly and is provided at its lower extremity with a bearing head 4. The bearing head 4 on the lower end of piston rod 3 (see Fig. 4) is slotted transversely through its central portion and confines loosely therein the rounded extremities of the two horizontal pivoted levers 5ª and 5ᵇ, one of said levers 5ª having a forked extremity, between which extends the extremity of the other arm 5ᵇ. The slot within the bearing head is provided with horizontal bearing surfaces 4ª upon its upper and lower sides (see Fig. 4), and, furthermore, said slot diverges outwardly from said bearing surfaces, thereby permitting a limited rocking motion of the levers and a sliding motion in opposite directions of the rounded extremities of the levers within the bearing head 4. The said arms are pivoted upon brackets 6, 6, rigidly secured to a horizontal beam 7. Said brackets are located at equal distances from the central axis of the piston rod, upon opposite sides thereof, and so positioned that the levers 5ª, 5ᵇ, each have long and short arms, the long arms being approximately twice the length of the short arms and engaged by the bearing head 4, while the short arms are connected with the upright links 11 (see Fig. 1). The said horizontal beam 7 is provided at its extremities with cross beams 8 (see Fig. 2) rigidly connected at their central portion to the said beam 7, and supporting at their extremities the vertical side rods 9. Said side rods 9 extend upward through guide apertures at the corners of the table 1 and in sliding engagement with said table, and support at their upper extremities the vertically reciprocating pressure plate 10, located directly over the table. The pressure plate 10 is thus adapted to apply the required pressure upon any material placed between the same and the table 1, and in the case of a stereotyping press, said plate 10 is adapted to support the type form mounted thereon with its face downward.

Vertical links 11, which are pivotally connected at their lower ends with levers 5ª and 5ᵇ, as already described, are pivotally connected at their upper ends with the stationary table by means of depending brackets 12.

The cylinder is provided at its upper and lower ends, respectively, with pipe connections 13 and 14, which admit and discharge at proper intervals the pressure fluid under suitable pressures to actuate the movable members, there being suitable valve mechanism provided to control the inlet and discharge of the fluid to and from the ends of the cylinder thereby effecting the reciprocatory movement of the piston and parts connected therewith.

Referring to the piston in detail (Fig. 5), the same comprises two main members or piston disks which may be called, for convenience, a primary or lower piston disk or piston head 16 and a secondary or upper piston disk or follower 15. The said primary or lower piston member 16 is connected to the piston rod 3 through the medium of a ball and socket joint 17, said joint being preferably of this type in order to prevent any irregular movements in the movable frame from being transmitted to the piston, with a resultant binding thereof. The secondary or upper piston member 15 is so connected to the lower piston member 16 as to have a limited axial movement relative to said lower piston member. A bolt 18, rigidly anchored within said lower piston disk and having screw-threaded engagement therewith, extends upwardly through an axial bore 19 of the upper piston member or follower 15 and terminates in a central depression 20 in the latter. A bearing sleeve 21, formed preferably of bronze or like metal, is located within said axial bore 19 and surrounds the said bolt 18. A nut 22 is mounted upon the reduced end of said bolt and rests upon a collar 23 fitting within the depression 20 and rigidly interposed between said nut and a shoulder formed at the base of the reduced extremity of the bolt. Between the lower and upper piston members and encircling the bolt 18 is a coiled tension spring 24, adapted to exert a constant pressure upon said upper piston member in a direction to force the said upper and lower piston members apart. The upper disk or piston member is provided with an annular peripheral groove 25, within which lie a plurality of annular expansible packing rings 26, bearing outwardly against the wall of the cylinder. Immediately behind said packing rings are a plurality of split rings 27, in interposed relation, in said groove. The outer ring 27 is in engagement with and encircled by the inner surfaces of the rings 26 and said rings 27 are adapted to constantly force the packing rings 26 yieldingly outward into contact with the wall of the cylinder. The outward pressure exerted by the said split rings may be regulated by means of circular or U-shaped springs 28 (see Fig. 7). The said springs 28 lie in inwardly and radially disposed recesses 29 and are in themselves adjustable. The said springs 28 comprise a flat strip of steel 28$^a$, circular in shape and provided with outwardly extending fingers 28$^b$.

Extending almost diametrically across the circular portion of each spring 28 is a bar 28$^c$, the ends of which bear against the inner surface of the circular portion of the spring. A screw 28$^d$ extends through each spring and the corresponding bar and at right angles to the latter, and has screw-threaded engagement with both bar and spring. Said screw is adapted to vary the distance between the fingers 28$^b$ and thus regulate the tension of the spring. The springs 28 (see Fig. 7) perform their function in the following manner: the innermost of the split rings 27 is divided into sections, there being a space between the extremities of the sections adjacent to the recesses containing the springs 28. The outwardly extending fingers 28$^b$ of the said springs 28 bear against the ends of the said sections of the inner split ring and by reason of the expansive tendency of the springs the sections of the inner split ring are forced outward against the remaining split rings 27, which in turn exert a similar force upon the packing rings 26.

The packing rings 26, the split rings 27, and the springs 28 are inclosed within the groove 25 and recesses 29 by an annular cover plate 30 of an exterior diameter substantially equal to that of the cylinder, and which fits over an annular upwardly projecting flange 15$^a$ of the upper piston member or follower proper. Said cover plate 30 is rigidly held in position by means of stay bolts 31 extending upwardly through the upper piston disk or follower and anchored in said cover plate 30. Said cover plate is also provided with an annular depression 32, in its upper surface and at its central portion, said depression being greater in diameter than that of the depression 20 of the upper piston disk or follower proper. Within said central depression 20 in the follower plate or upper piston disk is a coiled tension spring 33 bearing upon the collar 23 at its lower end and against a bearing plate 34 at its upper end. Said spring 33 is so placed that its inner end engages the collar 23 which is secured to the bolt or pin 18, fixed to piston member 16, and its opposite end engages the plate 34 which is in fixed relation to the piston member 15. The spring 33 being compressible and thus mounted between the plate 34 and collar 23 is adapted to yieldingly resist the movement or approach of the upper piston disk or piston member 15 toward the lower piston member 16. The bearing plate 34 fits within the central perforation 32 in the cover plate 30 and is rigidly connected with the latter and thereby with the piston member 15 by means of a suitable number of screws or bolts 34$^a$. The parts 34, 30 and 15 thus form rigidly connected parts of an upper piston member which is yieldingly connected with and movable with respect to or toward and from the piston member 16 which is connected with the piston rod. A coiled spring 35 on the plate 34 is adapted to engage the cylinder head and to act as a buffer when the piston approaches the end of its upward stroke. An annular packing 34$^b$ is placed between the adjacent surfaces of the bearing plate 34 and the cover plate 30 and within the depression or central aperture 32 thereof.

The outer adjacent peripheral edges or surfaces of the piston members 15 and 16 are beveled so as to form adjacent inclined surfaces 36 which are disposed at an angle of approximately 45° with respect to each other and with respect to the axial line of the piston and cylinder. These inclined surfaces are adjacent to the inner peripheral wall of the cylinder and, with the latter, form an annular, retaining groove between the adjacent peripheral edges of the main relatively movable piston members 15 and 16, and which groove is approximately triangular in cross section. Lying within this groove are two packing rings 37 and 38 (see Figs. 5 and 10 to 14), formed preferably of bronze or similar metal and of a shape to conform with their retaining groove. The adjacent horizontal surfaces of these rings are in bearing engagement. In order that the packing rings 37 and 38 may expand radially, said rings are each transversely severed, and joined at one point by an expansion joint. This expansion joint is preferably constructed as follows: Recesses 42, 42 (see Figs. 11 and 12) are formed in the inclined surface of each ring adjacent to the meeting ends thereof, and guide slots 43 are provided in the bottom of each recess. Said slots 43 extend circumferentially of the ring. A curved plate 44 (see Figs. 12 and 13), provided with pins 44$^a$, is adapted to rest within said recesses 42, with its outer face flush with the inclined surface of the ring. The pins 44$^a$ are in engagement with the slots 43, 43, so as to hold the plate in proper position relatively to the ends of the ring. The packing rings 37 and 38, thus constructed, are adapted to be forced outward into yielding engagement with the walls of the cylinder, when the upper and lower piston members 15 and 16 are pressed or forced toward each other, as will be more fully hereinafter described. Lying within the space between the piston disks and adjacent to the packing rings 37 and 38, is a lubricating ring 39 of felt or other absorbent material. Said ring is adapted to absorb the lubricant that flows by gravity into the space between the piston disks, and to thereby supply the lubricant to the contacting surfaces of the rings 37 and 38 and the said piston members.

A plurality of guide pins 46 are rigidly anchored in the lower piston member 16 and project upward into engagement with holes 46$^a$ formed in the upper piston member 15; said holes being of a depth sufficient to permit a relative axial movement of said piston members 15 and 16. These guide pins are adapted to prevent any relative movement between the upper and lower piston members. Located between the upper and lower disks or relatively movable piston members is an adjustable stop device adapted to limit the movement of the upper piston member 15 toward the lower piston member 16. This stop device comprises the following mechanism: A stationary or upper adjusting ring or stop member 47 is rigidly secured to the upper piston member 15 by means of screws 47$^a$, and a movable or lower adjusting ring 48 rests in a retaining groove in the other piston disk or main piston member 16 and is free to rotate thereon. The said adjusting rings or stop members 47 and 48 bear upon each other along a plurality of inclined surfaces 47$^b$ and 48$^a$ (see Fig. 9) formed upon the adjacent surfaces of said rings. These inclined surfaces are adapted to coact one with the other in such a manner that by rotating the lower ring 48 in either direction relative to the upper ring 47, the extent of movement of the upper piston member or disk 15 toward and from the lower piston disk 16 may be increased or decreased. For the purpose of rotating the lower adjusting member 48, the same is provided with a laterally extending segment 48$^b$ having gear teeth (see Fig. 6) formed upon the outer margin thereof. Meshing with said gear teeth is a gear wheel 49, which is fixed to an upright shaft 50 extending through the lower piston member 16 and through the lower cylinder head. Packing boxes 16$^a$ and 2$^b$ (see Fig. 1) are provided upon the lower piston member 16 and outside of the cylinder head 2$^a$, respectively, to prevent leakage of the fluid at the points where the shaft 50 extends through them. The shaft 50 terminates adjacent to the bearing head 4 (see Fig. 1) and is provided with a micrometer wheel 51 rigidly attached thereto. A pointer 52 is attached to the bearing head 4 and adapted to register with the graduations upon the micrometer wheel 51. By this means the shaft 50 may be rotated to a desired extent thereby causing the adjusting ring 48 to rotate a corresponding distance so as to accurately adjust the ring 48 and determine the relative positions of the adjusting rings 47 and 48. Any suitable means, shown here as a set screw 53 (see Fig. 9) is provided in order to prevent the rotation of the shaft 50 after the proper adjustment of the rings 47 and 48 has been made.

In describing the operation and purpose of this improved piston and adjusting mechanism, let it be assumed that the downward stroke of the piston is the power stroke and that the upward or return stroke is idle or without a load. A pressure fluid, which may be water, air or steam, is admitted to the space above the piston at the normal pressure of say 200 pounds per square inch during the power stroke, and the fluid having a much lighter pressure is admitted to the space below the piston during the return stroke. The fluid admitted for the return stroke may be under a pressure of 15 pounds per square inch, there being provided a proper valve mechanism, or fluid supply mechanism, to control the movements of the piston.

During the downward stroke of the piston the fluid pressure upon the upper piston member comprising part 15 overcomes the resistance of the springs 24 and 33, and the said upper piston member properly packed as described by means of packing rings 26 and 27, approaches the lower piston disk or main piston member or piston head 16 until stopped by the contact of the adjusting rings or stop members 47 and 48, which have been previously set by the micrometer wheel. The movement of the upper piston disk or follower member toward the lower piston disk or piston head forces the packing rings 37 and 38 outward, by reason of the sliding engagement between the beveled bearing surface of said rings and the adjacent beveled surfaces of the piston members 15 and 16. The degree of pressure of the said packing rings against the cylinder wall is increased in proportion to the increase in the resistance and the pressure applied and prevents the leakage of the fluid between the piston and the cylinder wall, and also prevents a loss of pressure within the space above the piston. These conditions will exist until the piston reaches the end of its power stroke, which need not be necessarily the extreme limit of its travel. At this point, wherever it may be, the piston may come to rest, and may be allowed to remain in one position, so as to hold the presser plate in fixed position, for any desired length of time, by the pressure maintained upon the piston. The high pressure may be relieved when desired and the fluid under a lower pressure admitted to accomplish the return stroke of the piston. At the instant the high pressure is relieved, the piston disks are forced apart by the action of the springs 24 and 33, and the packing rings 37 and 38 contract and cease to bear against the walls of the cylinder to an extent which will cause any appreciable degree of frictional resistance to the backward movement of the piston. The piston rings 26 and 27, acting with uniform pressure, during the return stroke of the piston, act to prevent the leakage of the fluid past the piston, under the relatively low pressure required to effect such return stroke. From the above, it follows that the packing rings in the upper piston member 15 act uniformly, with only such pressure on the cylinder wall as is required to prevent leakage when the piston is given its return stroke under the low and uniform pressure required for such return stroke, while the packing rings between the piston members are forced outwardly with variable pressure, depending on the amount of pressure exerted on the piston in its power stroke.

In a piston made as described, the inclination of the contact surfaces of the piston members and packing rings may be such that with a piston of a given area subject to a predetermined pressure, as required for certain work, the packing rings may be forced outwardly with such degree of pressure as to prevent leakage or any diminution of the pressure in the cylinder, for a long period of time, and the outward pressure of the packing rings may be so great as to lock or hold the piston from any further movement under the pressure exerted. Such outward pressure may, however, be so great during the stroke of the piston under a very high pressure, as to hold the same from movement before the piston reaches the desired limit of its advance movement, or a desired high pressure has been applied to the material being compressed, and in some cases the packing rings may be forced outward with such force as to even break the cylinder. To avoid the possibility of such an excess of pressure the adjustable stop device is provided, embracing the lower adjusting ring 48 to the upper adjusting ring 47. The adjustment of said rings enables the relatively movable piston members 15 and 16 to be held at a desired minimum distance from each other, thus preventing any undue or excessive outward pressure of the packing rings 37 and 38 against the wall of the cylinder, while permitting the control of such pressure, so that leakage will be prevented under the maximum fluid pressure required for doing any certain work. By the use of the adjusting rings or stop members 47 and 48, actuated by the shaft 50, the pressure of the packing rings relatively to the pressure of the fluid upon the upper side of the piston may be easily and conveniently regulated. The micrometer wheel may be accurately graduated to indicate the position of the adjusting ring 48, so that the operator can easily get the same to produce the desired or proper outward pressure of the packing rings against the cylinder wall.

Another principal advantage gained by the construction described is that due to the use of the two sets of packing rings in the piston, one acting uniformly under the uniform smaller pressure required in the return stroke of the piston and the other acting variably to give greater resistance to leakage as the pressure required in the working stroke of the piston is increased.

Another one of the principal advantages gained is that the pressure of the packing rings may be accurately regulated so as to enable the pressure to be retained and unnecessary friction prevented, through a large range of variation in the fluid pressure utilized for operating the press. Such regulation is accomplished in such manner as to permit a relatively low, gradually increasing, and finally constant pressure to be applied upon the material being pressed, and the high pressure to be maintained for any desired length of time, without leakage of the fluid and attendant loss of pressure.

A further advantage gained is that the packing rings, so adapted to prevent the leakage or escape of fluid under very high pressures may, by the adjustment of the stop device, be prevented from exerting a pressure against the cylinder wall, such as would cause the piston to bind, the cylinder to break, or produce undue wear of the said packing rings and of the cylinder. Moreover, the adjusting mechanism may be utilized to compensate for the wear upon the packing rings, thereby maintaining constant the outward force exerted by the said rings notwithstanding such wear.

By the use of the above described construction in the lever connection between the piston rod and presser plate, a distinct advantage is gained over a construction in which the piston rod is directly connected with the beam 7 or with the presser plate or part to be actuated by the piston and piston rod, and whereby the power transmitted to the presser plate 10 would be substantially the same as that delivered to the piston. The levers 5, 5, being pivotally connected to the vertical links 11 at their outer extremities and similarly mounted upon the brackets 6, 6, at a point between the extremities, the said outer extremities acting as fulcrums for said levers. The obvious result of this arrangement of levers and links is an increase in the power delivered at the brackets 6, 6, and therefore, a corresponding increase of the pressure that may be applied by the presser plate 10. The movement of the presser plate relative to that of the piston is decreased in the same degree. The sacrifice of extent of movement for power in the presser plate is very desirable in power presses of this type.

Although valves of any suitable form may be applied to the pipes 13 and 14 to control the entrance into the cylinder of the actuating fluid and therefore the reciprocating movement of the piston, I prefer to use for this purpose a single, manually operable valve of improved form, constituting in connection with a storage tank, a part of my invention. Figs. 15 to 21 illustrate high and low pressure storage tanks in connection with the valve referred to, which latter may be mounted upon the press in any suitable position, although preferably adjacent to the cylinder and shown in the drawings as mounted on a bracket attached to the side of the cylinder. The said valve is particularly adapted for power presses of the type described, in association with a storage tank. The principal feature of the valve is a construction and arrangement thereof, whereby the high pressure fluid, which is admitted to the cylinder to force the piston downward during its power stroke, is exhausted into a low pressure storage tank after the piston has reached the end of its power stroke. Said valve is also so constructed that fluid may be admitted from the said low pressure tank into the cylinder at the low pressure side of the piston, and therein utilized to exert a pressure upon the piston to actuate the same during its return stroke.

It has been pointed out in a previous part of this specification that the fluid pressure required to raise the moving parts during the return stroke is much less than that exerted upon the piston during its power stroke. The exhaust fluid from the high pressure side of the piston will still retain sufficient energy, by reason of its compressed condition, to raise the piston during its return stroke, so that by the use of the storage tank and the valve, adapted to operate as stated, the same pressure fluid used for delivering the piston in its power stroke may be employed for moving the piston in its return stroke, whereas with ordinary controlling valves in the pipes 13 and 14, the exhaust fluid from the high pressure side of the piston would be exhausted into the atmosphere, and a large part of its potential energy wasted, while a new supply of the fluid would have to be admitted to the low pressure side of the piston during the return or non-operative stroke of the same. By the use of the valve illustrated the efficiency of the press is greatly increased, owing to the fact that a smaller amount of the compressed fluid is required to operate the press in doing a specified amount of work.

A controlling valve, transmitting pipes and high and low pressure tanks (see Fig. 15), are shown as arranged to control a press in which compressed air is used as the actuating medium. Referring to the pipes in connection with the valve, tanks and the cylinder, a high pressure tank 60 is adapted to be supplied with air under high pressure from a compressor (not shown) through the supply pipe 61. A second supply pipe 63 leads from the high pressure tank 60 and transmit the high pressure air to the valve 64. Said high pressure supply pipe enters the valve casing at the bottom thereof, by a vertical pipe connection 63ª. The high pressure air reaches the cylinder 2 through a horizontal pipe connection into the pipe 13, which communicates with the interior of the cylinder at the top thereof. A pipe 65 extending upward from the top of the valve casing, leads to the low pressure storage tank 66 and is adapted to transmit the exhausted air from the high pressure side of the piston to said low pressure tank. A branch pipe 67 extends from another pipe connection of the valve and joins the pipe 65, said pipe 67 being provided with a pressure reducing valve 68, the purpose of which will be hereinafter fully described. A second pipe 69 leads from the tank 66 back to the valve, entering the valve casing at the top thereof. Said pipe 69 is adapted to transmit the low pressure air to the valve, by which it is directed through the pipe 14 to the low pressure end of the cylinder. An exhaust pipe 70 is provided on the valve casing whereby the air may be exhausted into the atmosphere at the proper times.

In order to avoid confusion and to aid in understanding the description of the valve relative to the pipes above referred to, and the operation thereof, the several ports within the valve and those connecting the valve with said pipes will, so far as possible, bear the same reference numerals. The direction in which the air flows in the pipes is indicated by arrows in Fig. 15. In some instances the pipes transmit the air in both directions in which case the arrows point in both directions.

Referring to the construction of the valve, (see Figs. 16 and 17) the casing of the same is generally cylindrical in shape, and comprises an upper member 71 and a lower member or cover 72. The upper member 71 of the valve casing is provided upon its periphery with a plurality of like pipe connections 71ª extending radially outward therefrom, adapted to be joined to the several pipes 13, 67, etc. Ports (bearing the same reference letters as the pipes) extend inwardly from said pipe connections half-way toward the central axis of the upper member 71 of the valve casing and then turn downwardly at right angles and open through the lower surface of the said member 71. Extending vertically downward from the upper surface of the upper member 71 of the valve casing and adjacent to the central axis thereof, are two ports 65' and 69', likewise connected with pipes (see Fig. 15), which bear the same reference numerals, and similarly extending through the valve-body. The cover 72 is cup-shaped and is rigidly secured to the member 71 by means of a plurality of cap screws 72ᵇ. Said cover fits over an annular shoulder 71ᵇ formed upon the lower surface of the upper member 71, thereby forming a closed valve chamber 73. Contained within the said chamber is a rotatable valve disk 74 (see Figs. 17 and 18) provided with a stem 74ª which extends upward through a central bore in the upper member 71 of the valve casing and slightly above the same. The upper extremity of the valve stem 74ª is provided with screw-threads, which engage an adjustable nut 75 (preferably a lock nut) which may be regulated to maintain the upper surface of the valve disk in close contact with the lower face of the upper member 71. A handle 76 is secured to the upper end of the valve stem, whereby the valve disk may be rotated.

A pipe connection 72ª, provided at the lower face of the cover 72, connects the high pressure supply pipe 63 (see Fig. 15) with the chamber 73. Extending through the valve disk 74 and adjacent to its periphery is a port 77 adapted to register with the port 70' or 67', thereby enabling a connection to be made between the chamber 73 and either one of the above-mentioned ports. Upon the upper surface of the valve disk are further provided a plurality of grooves 78, 79 and 80 (see Figs. 17 and 18) of sufficient width and depth to form together with the lower face of the upper member 71 a plurality of ports or passages. The outer passage 78 (see Fig. 18) is formed upon the arc of a circle concentric with the periphery of the disk, and is in a length equal to one-quarter of the circumference of the disk. Said passage 78 is adapted to register with the ports in the upper member 71 lying in the path of a similar circle passing through the centers of the ports 70', 13', 67' and 14'. The purpose of the passage 78 is to connect the exhaust port 70' with the port 13' leading to the high pressure end of the cylinder, in one position of the valve disk, and to connect said exhaust port with the port 14' leading to the low pressure cylinder in another position of the valve disk. The passage 80 which is somewhat shorter and slightly curved is adapted to connect the port 13' leading to the high pressure end of the cylinder with the port 65' leading to the low pressure tank 66, during one position of the valve disk. The short passage 80 forms a connection between the ports 69' and 14' in one position of the valve disk, in which position the fluid may pass from the low pressure tank 66 into the low pressure end of the cylinder. The port 77 through which is admitted the high pressure air from the tank 60 and the pipe 63, is adapted to register only with the port 13' leading to the high pressure end of the cylinder and with the port 67' which leads to the low pressure tank by way of the reducing valve 68 and the pipe 65.

There are three operative positions of the valve disk relative to the several ports, which are indicated by proper marks upon the upper surface of the upper member 71 of the valve casing, adjacent to the handle 76, and by means of which the operator may properly set the valve. These three positions correspond with the three events which take place within the cylinder, to wit, first, the admission of high pressure fluid into the high pressure end of the cylinder, to move the piston downward on its power stroke and the simultaneous exhaust to the atmosphere of the air in the low pressure side of the piston, remaining from the return stroke just completed; second, the completion of the high pressure stroke, at which point the air from the high pressure side of the piston is allowed to pass into the low pressure tank; third, the upward stroke of the piston in which air from the low pressure tank is admitted to the low pressure side of the piston, to move the piston upward and at the same time the exhaust to the atmosphere of the air on the high pressure side of the piston remaining therein after the preceding event. Observing the fact that the low pressure tank will receive air from the high pressure side of the piston only so long as the pressure of the air in the cylinder is greater than that in the tank, it follows that there is retained in the cylinder a volume of air, having the same pressure as that of the low pressure tank, which must be exhausted to permit the upward stroke of the piston.

Keeping in mind the events occurring in the cylinder, the operation of the valve at each position corresponding to the above-mentioned events will be better understood. To aid in the description of the valve operation, three diagrammatic views (Figs. 19, 20 and 21) are provided, in which the several ports in the valve body are shown in full lines and the outlines of passages 78, 79 and 80 of the valve disk are shown in full lines also. Attention is directed to the fact that two ports must be included in the outline of the single passage in order to show a connection between two of the ports.

Referring to the first position of the valve, Fig. 19, corresponding to the first event occurring in the cylinder, in this position the high pressure air is entering the valve at the bottom through the pipe 63 (see Fig. 15) and passing through the aperture 77 of the valve disk 74. The aperture 77 now registers with the port 13', so that the air is admitted to the high pressure end of the cylinder, while the port 14' is connected with the exhaust port 70'. The air is thus being exhausted to the atmosphere at the same time the high pressure air is being admitted to the high pressure end of the cylinder to actuate the piston in its downward or power stroke. The remaining ports in the valve disk at this time do not register with a passage so that the other pipes and passages are at this time closed against the passage of the fluid.

Assuming that the piston has reached the end of its power stroke and the second event is about to take place, the valve disk is now moved to its second position (see Fig. 20) by revolving the same counter-clockwise (referring to the diagram) through an angle of approximately 45°. The aperture 77 does not now register with a port, hence the air from the high pressure tank is shut off. The passage 80 connects the port 13' with the port 65', which allows the air in the high pressure end of the cylinder to pass into the low pressure storage tank 66 (see Fig. 15) owing to the greater pressure of the air in the cylinder than in the tank. This passage of air continues until the pressures in the cylinder and the tank become balanced; it being noted that there still remains in the cylinder a volume of air under a pressure equal to that of the low pressure tank. As in the first position of the valve, the ports 14' and 70' are connected in the second position by the passage 78, which connection has no effect on the operation, for the piston is now at the lower end of the stroke. The valve is now ready to be shifted to its third position which is done by revolving the disk by means of the handle through an angle of 45° beyond the second position and in the same direction, or, in other words, it has been rotated through 90° in passing from the first to the third positions. As before, the third position (see Fig. 21) corresponds to the third event in the cylinder, in which three distinct steps are accomplished, first, the port 69' is joined to the port 14' by the short passage 79, which connects the low pressure tank with the low pressure side of the piston, thus supplying the air pressure to move the piston during its return stroke; second, the port 70' is connected with the port 13', by means of the passage 78, thus allowing the air remaining in the high pressure end of the cylinder to be exhausted into the atmosphere during the upward stroke of the piston; and third, the aperture 77 is brought in a position to register with the port 67' which is connected with the pipe 67 (see Fig. 15) branching from the pipe 65 leading to the low pressure tank and provided with the reducing valve. The purpose of this connection, as well as the presence of the reducing valve, may be explained as follows: In case the pressure in the low pressure tank has fallen below the normal pressure, at which it supplies air to the low pressure end of the cylinder, a quantity of air directly from the high pressure tank may be admitted to the said low pressure tank until the pressure therein has been restored to the normal. The reducing valve 68 is necessary in the pipe 67 in order that the air in passing therethrough will be reduced from the pressure of the high pressure tank to that of the low pressure tank, and, furthermore, the reducing valve being set to operate only at the normal pressure in the low pressure tank, acts as a check, thus allowing the air to pass from the high into the low pressure tank only when the pressure in the low pressure tank has fallen below its normal. It is evident, therefore, that the so-called by-pass 67 and the reducing valve, is a precautionary agent rather than an actual factor in the operation of the valve. When the return stroke has been completed, the valve is turned again to the first position and the cycle of operation just described is repeated.

A power press embodying the features of construction herein set forth may be variously modified without departure from the spirit of my invention, and I do not, therefore, desire to be limited to the specific construction illustrated, except as pointed out in the appended claims.

I claim—

1. A double-acting piston comprising in its construction a pair of main piston members mounted in movable relation to each other, an expansible packing ring extending between said main piston members and adapted to be pressed outward against the cylinder wall by the movement of the said piston members toward each other during the power stroke of the piston, and expansible packing rings mounted upon one of said piston members adapted to be constantly forced outward in contact with the cylinder wall.

2. In a mechanism of the class described, the combination of a cylinder, a pair of connected double-acting piston members mounted in movable relation to each other in the cylinder, a packing ring extending between said main piston members and adapted to be pressed outward against the cylinder wall during the power stroke of the piston by the movement of said piston members toward each other, and expansible packing rings mounted upon one of the main piston members and in constant engagement with the cylinder wall.

3. In a mechanism of the class described, the combination of a cylinder, a pair of double-acting piston members mounted in movable relation to each other in the cylinder, said piston members having adjacent peripheral surface portions disposed at an angle with relation to each other and adapted to admit a packing ring therebetween, a packing ring extending between said beveled peripheral surface portions and in sliding engagement therewith, and adapted to be forced outwardly against the wall of the cylinder by the movement of the piston members toward each other during the power stroke of the piston, expansible packing rings mounted upon one of the said main piston members, and means for holding said expansible packing rings constantly in yielding engagement with the inner surfaces of the cylinder.

4. A piston comprising in its construction a pair of main piston members mounted in movable relation to each other, a packing ring extending between said main piston members and adapted to be pressed outward by the movement of the latter toward each other, stop mechanism for limiting the movement of said main piston members toward each other, and means for adjusting said stop mechanism, exterior to the piston.

5. In a mechanism of the class described, the combination of a cylinder, a pair of loosely connected main piston members mounted in movable relation to each other in the cylinder, a packing ring extending between said main piston members and adapted to be pressed outward by the movement of the latter toward each other during the power stroke of the piston, expansible packing rings mounted upon one of the main piston members and in constant yielding engagement with the cylinder wall, stop mechanism connected with the main piston members and adapted to limit the movement of the main piston members toward each other, and means for adjusting said stop mechanism exterior to the cylinder.

6. A piston comprising in its construction a pair of main piston members mounted in movable relation to each other in the cylinder and having adjacent peripheral surface portions disposed at an angle with relation to each other and adapted to admit a packing ring therebetween, a packing ring extending between said adjacent peripheral surface portions and by sliding engagement therewith to be forced outward in contact with the cylinder wall during the power stroke of the piston, expansible packing rings mounted upon one of the said main piston members adapted to be forced outward in constant engagement with the cylinder wall, stop mechanism adapted to limit the movement of the main piston members toward each other, and adjusting means operatively connected with said stop mechanism and extending exterior to the cylinder.

7. A piston comprising in its construction a pair of main piston members, means for connecting said piston members in movable relation to each other, a packing ring extending between and in engagement with the adjacent peripheral edges of said main piston members and adapted to be pressed outward by the movement of the main piston members toward each other, spring mechanism in operative engagement with said main piston members and adapted to yieldingly resist the movement of said main piston members toward each other, stop mechanism connected with the main piston members and adapted to limit the movement of the main piston members toward each other, and adjusting means operatively connected with said stop mechanism and extending exterior to the cylinder.

8. A piston comprising in its construction a pair of main piston members, means for connecting said piston members in movable relation to each other, expansible packing rings mounted upon one of the main piston members and adapted to constantly and yieldingly engage the inner surface of a cylinder, a packing ring extending between and in engagement with the adjacent peripheral edges of said main piston members and adapted to be pressed outward by the movement of the main piston members toward each other during the power stroke of the piston, spring mechanism in operative engagement with said main piston members and adapted to yieldingly resist the movement of said main piston members toward each other, stop mechanism connected with the main piston members and adapted to limit the movement of the main piston members toward each other, and adjusting means operatively connected with said stop mechanism and extending exterior to the cylinder.

9. In a mechanism of the class described, the combination of a cylinder, a double-acting piston comprising in its construction a pair of main piston members, means for connecting said piston members in movable relation to each other, expansible packing rings mounted upon one of the main piston members and adapted to constantly and yieldingly engage the inner surface of the cylinder, a packing ring extending between the adjacent peripheral edges of the main piston members and adapted to be pressed outward by the movement of the said piston members toward each other during the power stroke of the piston, a bolt rigidly connected with one of said piston members and slidably mounted in the other piston member, and a spring surrounding said bolt between said piston members adapted to yieldingly resist the movement of the said main piston members toward each other.

10. In a mechanism of the class described, the combination of a cylinder, a piston comprising in its construction a pair of main piston members, means for connecting said piston members in movable relation to each other, expansible packing rings mounted upon one of said piston members and adapted to yieldingly engage the inner surface of the cylinder, a packing ring extending between the adjacent peripheral edges of the main piston members and adapted to be pressed outward by the latter, spring mechanism in operative engagement with said main piston members and adapted to yieldingly resist the movement of the said main piston members toward each other, a piston rod, and means for connecting one of said main piston members with the piston rod.

11. In a piston for power presses, the combination with a cylinder, of a primary disk, a piston rod connected with the primary disk, a secondary disk loosely connected to said primary disk and having a limited axial movement relative thereto, provided with peripheral packing rings mounted on said secondary disk and packing rings interposed between said disks and adapted to be pressed outward by the latter, and adjustable stop mechanism adapted to limit the approach of the secondary disk toward the primary disk.

12. In a double-acting piston for power presses, the combination with a cylinder, of a primary disk, a secondary disk loosely connected to said primary disk and having a limited axial movement relative thereto, and provided with an annular groove, a plurality of outer expansible packing rings within said groove and adjacent to the wall of the cylinder, a plurality of split rings within said groove and adjacent to and encircled by said packing rings, tension means acting upon the innermost of said split rings adapted to exert a constant outward force upon said outer packing rings, and packing rings interposed between said disks and adjacent to the cylinder wall, adapted to be forced outwardly in contact with the cylinder wall, by the movement of the said primary and secondary disks toward each other during the power stroke of the piston.

13. In a piston for power presses, the combination with a cylinder, of a primary disk, a secondary disk loosely connected to said primary disk and having a limited axial movement relative thereto, and provided with an annular groove, a plurality of outer expansible packing rings within said groove and adjacent to the wall of the cylinder, a plurality of split rings within said groove and adjacent to and encircled by said packing rings, tension means acting upon the innermost of said split rings adapted to exert a constant outward force upon said outer packing rings, means for varying the outward force exerted by said tension means, packing rings interposed between said disks adapted to be forced outwardly by the movement of the primary and secondary disks toward each other during the power stroke of the piston, and externally controlled means adapted to limit the approach of said secondary disk toward said primary disk.

14. In a piston for power presses, the combination with a cylinder, of a primary disk, a secondary disk loosely connected to said primary disk and having a limited axial movement relative thereto, a plurality of packing rings upon the secondary disk adapted to be constantly forced outward in contact with the cylinder wall, a centrally located coiled spring adapted to force said disks apart, packing rings interposed between said disks and adjacent to the cylinder wall, adapted to be forced outwardly by the movement of said disks toward each other during the power stroke of the piston, and externally controlled, adjusting means for regulating the pressure of said packing rings upon the cylinder wall.

15. In a piston for power presses, the combination with a cylinder, of a primary disk, a secondary disk loosely connected with said primary disk and having a limited axial movement relative thereto, an annular groove in the cylindrical surface of said secondary disk and a plurality of recesses extending radially inward from the base of said groove, a plurality of packing rings within said groove and adjacent to the wall of said cylinder, a plurality of split rings within said groove and adjacent to and encircled by said packing rings, springs within said recesses and in engagement with the innermost of said split rings, and packing rings interposed between the margins of said disks adapted to be forced outward by the movement of said disks toward each other.

16. In a piston for power presses, the combination with a cylinder, of a primary disk, a secondary disk having a limited axial movement relatively to said primary disk and provided with an annular groove in the cylindrical surface thereof, a recess extending radially inward from the base of said groove, a plurality of peripheral packing rings within said groove, a plurality of split rings encircled by said peripheral rings and in concentric relation to each other, the innermost of said split rings having relatively movable end portions terminating at a distance from each other and adjacent to the said recess, a spring within said recess comprising outwardly extending fingers abutting against the extremities of said innermost split ring, a tension bar extending diametrically across and within the circular portion of said spring, and a screw having screw-threaded engagement with said tension bar and said spring and adapted to vary the tension of said spring.

17. In a piston for power presses, the combination with a cylinder, of a primary disk, a secondary disk having a limited axial movement relatively to said primary disk and provided with an annular groove in the cylindrical surface thereof, recesses extending radially inward from the base of said groove, a plurality of peripheral packing rings within said groove, a plurality of split rings encircled by said peripheral rings and in concentric relation to each other, the innermost of said split rings being divided into a plurality of sections terminating at a distance from each other and adjacent to the said recesses, springs within said recesses comprising outwardly extending fingers abutting against the extremities of the sections of the said innermost split ring, a tension bar extending diametrically across and within the circular portions of said springs, and a screw having screw-threaded engagement with said tension bar and said springs and adapted to vary the tension of said springs.

18. In a piston, the combination with a cylinder, of a primary disk, a secondary disk loosely connected with said primary disk and having a limited axial movement relative thereto, expansible packing rings interposed between said disks and adapted to be forced outward by the relative movement of the latter, adjusting rings interposed between said disks and provided with a plurality of inclined bearing surfaces, one of said rings being rigidly connected with one of said disks, and the other being loosely supported in a retaining groove of the other of said disks, and provided with a plurality of gear teeth upon the periphery thereof, a gear wheel adapted to mesh with said gear teeth, a shaft rotatably mounted in one of said disks and rigidly connected with said gear wheel, said shaft extending parallel to the axis of the piston and terminating exterior to the cylinder end, a micrometer wheel upon said shaft and provided with graduations, and a pointer adapted to register with said graduations of the micrometer wheel.

19. In a power press, the combination with a stationary table, of a cylinder rigidly mounted thereon, a piston within said cylinder, said piston comprising a disk rigidly attached to the piston rod, a second disk loosely attached to said first-mentioned disk and adapted to have limited axial movement relative thereto, packing rings interposed between said disks and adapted to be forced outward against the wall of the cylinder by the movement of the disks relative to each other, a movable frame, means for operatively connecting the piston with the movable frame, and manually operable, adjusting means adapted to variably limit the extent of movement of said disks toward each other.

20. In a piston, the combination of a primary disk and a secondary disk having limited axial movement relative to the primary disk, and provided with a central bore adapted to receive a bolt rigidly anchored within said primary disk, and a central annular space adapted to receive a collar, a nut in threaded engagement with the extremity of the said bolt, spring mechanism in operative engagement with said disks and adapted to resist the movement of the secondary disk toward the primary disk, an annular groove upon said secondary disk adapted to retain a plurality of packing rings, a plurality of packing rings in said groove, packing rings interposed between said primary disk and said secondary disk and adapted to be forced outwardly against the wall of the cylinder by the relative axial movement of the said disks, and manually operable means adapted to limit the relative movement of said disks toward each other.

21. In a piston for power presses, the combination with a cylinder, of a primary disk, a secondary disk having a limited axial movement relative to said primary disk and provided with an annular groove containing a plurality of packing rings adapted to be constantly forced outward against the wall of the cylinder, means adapted to regulate the outward force of said packing rings, packing rings interposed between said primary and secondary disks and adapted to be forced outward against the cylinder wall by the fluid pressure upon said secondary disk, during the power stroke of the piston, adjustable stop mechanism adapted to vary the force with which said packing rings engage the cylinder wall relative to the fluid pressure upon said secondary disk, indicating means mounted exterior to the cylinder, and means operatively connecting said indicating means with said stop mechanism.

22. In a piston for power presses, the combination with a cylinder, of a primary disk, a secondary disk loosely connected to said primary disk and adapted to have an axial movement relative to said primary disk by the fluid pressure exerted thereon, annular expansive packing rings interposed between said disks and adjacent to the cylinder wall, a stop ring rigidly secured to one of said disks and provided with a bearing surface disposed at an angle to the axis of said ring, a stop ring rotatably supported by the other disk and provided with an inclined bearing surface adapted to engage the bearing surface of the rigid ring, and means for rotating said rotatable ring with respect to the non-rotatable ring, to limit the movement of the secondary disk in a direction toward the primary disk.

23. In a piston for power presses, the combination with a cylinder, of a primary disk, a secondary disk loosely connected to said primary disk and adapted to have an axial movement relative to said primary disk by the fluid pressure exerted thereon, annular expansive packing rings interposed between said disks and adjacent to the cylinder wall, a stop ring rigidly secured to one of said disks and provided with a bearing surface disposed at an angle to the axis of said ring, a stop ring rotatably supported by the other disk and provided with an inclined bearing surface adapted to engage the bearing surface of the rigid ring, a series of gear teeth on the rotatable stop ring, a gear wheel in toothed engagement with said gear teeth, a shaft supporting said gear wheel and extending through said primary disk and through the wall of the cylinder to the exterior of the same, and means connected with said shaft and located on the outside of the cylinder, for rotating the shaft.

24. In a piston for power presses, the combination with a cylinder, a piston rod and a bearing head rigidly attached to said piston rod, of a primary disk, a secondary disk, packing rings interposed between said disks, adjusting rings also interposed therebetween, one of said adjusting rings being rigidly secured to the secondary disk, the other being supported upon said primary disk and rotatable relative thereto and provided with a plurality of gear teeth, a gear wheel in toothed engagement with said gear teeth and rigidly connected to a shaft rotatably mounted within said primary disk and extending parallel with said piston rod through the cylinder head and terminating adjacent to said bearing head, a micrometer wheel mounted upon the extremity of said shaft, and a pointer rigidly mounted upon said bearing head and adapted to register with the graduations of said micrometer wheel.

25. In a power press, the combination with a stationary table, a presser plate, a movable frame attached to said presser plate, a cylinder rigidly mounted on said table, a piston within said cylinder, a piston rod attached to said piston, of power transmitting means connecting said piston with said movable frame comprising a plurality of levers arranged radially and extending transversely with respect to said piston rod, said levers being pivoted between their ends to the frame and connected at their inner ends with said piston rod, and links arranged parallel with the piston rod and pivotally connected at their opposite ends to said table and to the outer extremities of said levers, respectively.

26. In a power press, the combination of a stationary table, a cylinder rigidly attached upon the under side of said table, a presser plate supported above said table, supporting means for said presser plate comprising vertical side rods and a horizontal beam located below the cylinder, a piston within the cylinder, a piston rod attached to said piston, and connecting means operatively connected with the piston and presser plate and adapted to transmit power from said piston to said presser plate, said connecting means comprising a bearing head integral with the piston rod, levers in engagement with said bearing head and vertical links pivotally attached to the outer extremities of said levers, and to the under surface of the said table and brackets rigidly mounted upon said horizontal beam and pivotally connected to said levers between the extremities thereof, substantially as described.

27. In a power press, the combination with a cylinder having a reciprocatory piston therein and a low pressure storage tank, of a valve casing provided with a plurality of ports, two of which communicate with the low and high pressure ends of the cylinder, respectively, and two of which communicate with the low pressure storage tank, and a valve member rotatably mounted in said valve casing and provided with passages adapted to connect with each other the ports communicating with the high pressure end of the cylinder and with the low pressure storage tank in one position of the valve disk, and to connect with each other the ports communicating with the low pressure tank and with the low pressure end of the cylinder in the other position of the valve disk.

28. The combination with a supply pipe, a storage tank and a cylinder having a reciprocatory piston therein, of a valve casing having a plurality of ports therein, said ports being severally connected with the supply pipe, the opposite ends of said cylinder and the tank, and a movable valve member adapted to connect said ports in different positions of the movable valve member, and acting in one position to direct the pressure fluid from the supply pipe to one end of the cylinder to effect the power stroke of the piston, in another position to direct the pressure fluid from the same end of said cylinder into the said storage tank, and in another position to direct said fluid from the storage tank into the opposite end of the cylinder to effect the return stroke of the piston and to exhaust the fluid within the cylinder on the opposite side of the piston.

29. In a power press, the combination with a high pressure supply pipe, a cylinder having a reciprocating piston therein, and a low pressure storage tank, of a valve embracing a valve casing provided with a valve chamber, one wall of which forms a valve seat, and with port openings in said valve seat, a rotative valve disk in said chamber having one face in contact with said valve seat and provided with passages in the valve disk adapted to connect pairs of said port openings in different positions of said valve disk, an aperture in said valve disk adapted to register with a plurality of said port openings, said high pressure supply pipe communicating with said valve chamber through an opening in the wall of the chamber opposite said valve seat.

30. In a power press, the combination with a cylinder having a reciprocating piston therein, a high pressure supply pipe and a low pressure storage tank, of a valve, embracing a valve casing provided with a cylindrical valve chamber, a rotatable valve disk contained within said chamber and provided with a valve stem, a handle mounted upon the said valve stem exterior to the valve casing, ports in said valve casing extending from the exterior thereof through a wall of said chamber at right angles to a face of the valve disk, an inlet port from said high pressure tank communicating with said chamber, an aperture extending through said valve disk adapted to register with two of the several ports, and a plurality of passages in the valve disk adapted to form means of communication between different combinations of the several ports when said valve disk is rotated.

31. In a power press, the combination with a cylinder having a reciprocating piston therein, a high pressure tank adapted to be supplied with air from a suitable compressor, and a low pressure tank, of a valve, comprising a valve casing having a cylindrical chamber therein, a valve disk rotatably mounted in said chamber, and having one face thereof in contact with a wall of the chamber, an aperture passing through said valve disk, an opening in said chamber communicating with said high pressure tank, a plurality of ports in the wall of the chamber in contact with the valve disk, and passages in the said valve disk adapted to so connect the ports as to transmit the air pressure from the high pressure tank to the cylinder during the power stroke, to return the exhaust air from the cylinder after the high pressure stroke to the low pressure tank, to transmit the air from the low pressure tank to the cylinder during the return stroke, and to permit the exhaust to the atmosphere of fluid contained in the high pressure end of the cylinder.

32. The combination with a pipe supplying fluid under a high pressure, a low pressure storage tank, a cylinder having a reciprocating piston therein, of a valve adapted to control the movement of said piston and comprising a valve casing having a plurality of ports therein, said ports being severally connected with the supply pipe, the said tank, both ends of the cylinder and with the atmosphere, and a movable valve member within said valve casing provided with passages adapted to connect said ports and acting in one position to direct the fluid pressure from the supply pipe to one end of the cylinder to effect the power stroke of the piston, and at the same time to permit the exhaust to the atmosphere of fluid from the opposite end of the cylinder, in another position of said member to cut off the fluid supply at the end of the power stroke and permit the exhaust of the high pressure fluid into the low pressure storage tank, and in a third position to admit the fluid from said low pressure tank to the opposite end of the cylinder for effecting the return stroke of the piston and to simultaneously permit the exhaust to the atmosphere of the fluid contained in the chamber on the opposite side of the piston.

33. In a power press, the combination with a cylinder having a reciprocatory piston therein, a high pressure supply pipe, and a low pressure storage tank, of a valve casing provided with a plurality of ports, one of which communicates with the high pressure supply pipe, two of which communicate with the cylinder, three of which communicate with the low pressure storage tank, and one of which communicates with the atmosphere, a rotatable valve member mounted in said valve casing connecting said ports and acting in one position to direct the high pressure fluid from the supply pipe to one end of the cylinder, to effect the power stroke of the piston, and at the same time to permit the exhaust to the atmosphere of the fluid in the opposite end of the cylinder, in another position of the said movable valve member, to cut off the high pressure fluid supply at the end of the power stroke, and permit the exhaust of the high pressure fluid from the cylinder, into the low pressure storage tank, and in a third position to admit the fluid from the low pressure storage tank to the opposite end of the cylinder, to effect the return stroke of the piston, to simultaneously permit the exhaust to the atmosphere of the fluid in the opposite end of the cylinder, and in case the pressure within the low pressure storage tank has fallen below the normal to admit high pressure fluid thereinto through suitable pressure reducing means, until the pressure within said low pressure storage tank has been restored to the normal.

34. In a power press, the combination with a cylinder having a reciprocatory piston therein, a high pressure supply pipe, and a low pressure storage tank, of a valve casing provided with a valve chamber, one wall of which forms a valve seat, and with port openings in said valve seat, a rotative valve disk in said valve chamber having one face in contact with said valve seat and provided with a plurality of grooves in said face of the valve disk adapted to connect pairs of said port openings in different positions of the valve disk, an aperture in said valve disk adapted to register with two of said port openings, passages in said valve casing communicating with said port openings of the valve seat, a reducing valve in one of said passages and an opening in the wall of said valve chamber opposite said valve seat communicating with said supply pipe.

35. In a power press, the combination with a cylinder with a reciprocating piston therein, a high pressure supply pipe, a low pressure storage tank, of a valve casing provided with a valve chamber, one wall of which forms a valve seat, a plurality of port openings in said valve seat and passages communicating with said port openings, two of said passages being connected with the cylinder, three with the low pressure storage tank and one with the atmosphere, a rotative valve disk in said chamber one face of which is in contact with said valve seat, grooves in said face of the valve disk adapted to connect pairs of said port openings in different positions of the valve disk, an aperture in said valve disk, adapted to register with one of the port openings communicating with the cylinder and one of the same communicating with the low pressure storage tank, a reducing valve interposed between said port opening and the storage tank, and an opening in the wall of said valve chamber opposite said valve seat, connecting said high pressure supply pipe with said valve chamber.

In testimony, that I, claim the foregoing as my invention I affix my signature in the presence of two witnesses, this 19th day of October A. D. 1912.

JOHN WILSON.

Witnesses:
JOSEPH BUTKUS,
JAHN AUN.